US011429377B2

(12) United States Patent
Mezaael et al.

(10) Patent No.: US 11,429,377 B2
(45) Date of Patent: Aug. 30, 2022

(54) VEHICLE UPDATE DATA SHARING

(71) Applicant: Ford Global Technologies, LLC, Dearborn, MI (US)

(72) Inventors: Abraham Mezaael, Southfield, MI (US); Shaheer Ahmed, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/399,168

(22) Filed: Apr. 30, 2019

(65) Prior Publication Data

US 2020/0348923 A1 Nov. 5, 2020

(51) Int. Cl.
| | | |
|---|---|---|
| *G06F 9/44* | (2018.01) | |
| *G06F 8/658* | (2018.01) | |
| *G06N 5/04* | (2006.01) | |
| *H04L 67/00* | (2022.01) | |
| *H04W 76/10* | (2018.01) | |
| *H04W 4/44* | (2018.01) | |
| *G07C 5/08* | (2006.01) | |

(52) U.S. Cl.
CPC ............. *G06F 8/658* (2018.02); *G06N 5/04* (2013.01); *G07C 5/085* (2013.01); *H04L 67/34* (2013.01); *H04W 4/44* (2018.02); *H04W 76/10* (2018.02)

(58) Field of Classification Search
CPC ...................................... G06F 8/658
USPC ......................................... 717/173
See application file for complete search history.

(56) References Cited

U.S. PATENT DOCUMENTS

| | | | |
|---|---|---|---|
| 8,209,608 B1* | 6/2012 | Linyard .................. | G06F 40/14 715/716 |
| 9,143,926 B2* | 9/2015 | Egner .................... | H04W 8/245 |
| 9,229,623 B1* | 1/2016 | Penilla .................. | H01M 10/46 |
| 9,229,704 B2* | 1/2016 | Throop .................. | B60L 58/13 |
| 9,274,785 B2 | 3/2016 | Jung | |
| 9,775,562 B2* | 10/2017 | Egner ................ | A61B 5/14546 |
| 9,992,701 B2* | 6/2018 | Egner ............... | H04W 28/0221 |
| 10,129,133 B2* | 11/2018 | Wahler .................... | H04L 67/12 |
| 10,180,835 B2 | 1/2019 | Hong | |
| 10,217,169 B2* | 2/2019 | Schumann, Jr. ........................... | G08G 1/096775 |
| 2013/0031540 A1* | 1/2013 | Throop .................. | G06F 8/654 717/173 |

(Continued)

FOREIGN PATENT DOCUMENTS

FR 2990092 A1 11/2013

*Primary Examiner* — Evral E Bodden
(74) *Attorney, Agent, or Firm* — Michael Spenner; Brooks Kushman P.C.

(57) ABSTRACT

A server includes a memory configured to store a software update for a vehicle; and a processor configured to responsive to receiving first usage data from the vehicle indicative of a usage pattern of the vehicle, analyze the first usage data to identify an entity associated with the vehicle; receive second usage data from the entity indicative of a usage pattern of the entity; predict the entity and the vehicle to be within a predefined distance for establishing a wireless connection based on the usage pattern of vehicle and the usage pattern of the entity; responsive to verifying a capability of the wireless connection, divide the software update into multiple partitions; and transmit one or more partitions to the entity for sharing with the vehicle over the wireless connection.

18 Claims, 4 Drawing Sheets

(56) References Cited

U.S. PATENT DOCUMENTS

| | | | | |
|---|---|---|---|---|
| 2014/0343831 | A1* | 11/2014 | Hosey | H04Q 9/00 |
| | | | | 701/113 |
| 2017/0055130 | A1* | 2/2017 | LeBlanc | H04W 4/027 |
| 2020/0228950 | A1* | 7/2020 | Clark | H04W 4/46 |

* cited by examiner

VEHICLE UPDATE DATA SHARING

TECHNICAL FIELD

The present disclosure generally relates to vehicle update data sharing. More specifically, the present disclosure relates to a mobility network system coordinating vehicle update data communications.

BACKGROUND

Modern vehicles are provided with various electronic controllers configured to control driving and entertainment operations. For instance, a powertrain control module (PCM) may be configured to control engine and transmission operations. An infotainment system may provide features such as navigations and telecommunications. The controllers are operated via software. Vehicle manufacturers publish new vehicle software updates for those controllers to keep the controllers up to date. Depending on the specific software, some update data file may be large, and it may be difficult to transfer the update file to many vehicles via a wireless network (e.g. a cellular network) at once.

SUMMARY

In one or more illustrative embodiment of the present disclosure, a server includes a memory configured to store a software update for a vehicle; and a processor configured to responsive to receiving first usage data from the vehicle indicative of a usage pattern of the vehicle, analyze the first usage data to identify an entity associated with the vehicle; receive second usage data from the entity indicative of a usage pattern of the entity; predict the entity and the vehicle to be within a predefined distance for establishing a wireless connection based on the usage pattern of vehicle and the usage pattern of the entity; responsive to verifying a capability of the wireless connection, divide the software update into multiple partitions; and transmit one or more partitions to the entity for sharing with the vehicle over the wireless connection.

In one or more illustrative embodiment of the present disclosure, a digital entity includes a memory; and a processor, configured to send vehicle usage data to a server; responsive to receiving a first partition from the server, store the first partition in the memory; receive a sharing instruction identifying a vehicle to which the first partition is designated; and responsive to establishing a wireless connection with the vehicle as identified, transmit the first partition to the vehicle.

In one or more illustrative embodiment of the present disclosure, a method for a server includes detecting a software update is ready for multiple fleet vehicles; receiving usage data from the multiple fleet vehicles; analyzing the usage data to identify associations between the multiple fleet vehicles; dividing the software update into multiple partitions based on the associations as identified; and transmitting at least one partition to at least one of the multiple fleet vehicles for data sharing.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle software update system. More specifically, the present disclosure proposes a vehicle software update system through data sharing coordinated by a manager.

Figure 1:
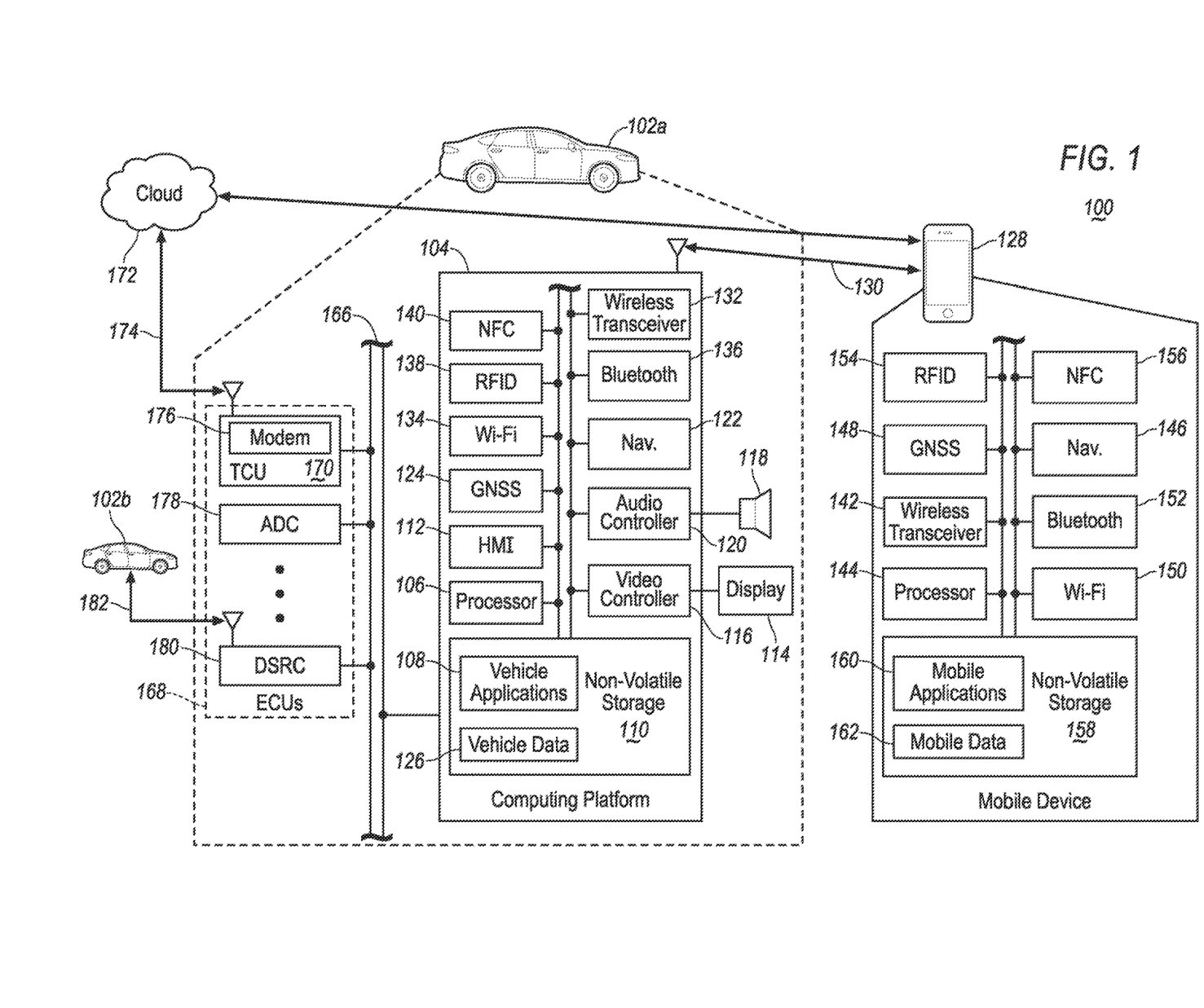
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102a may include various types of automobile, crossover utility vehicle (CUV), sport utility vehicle (SUV), truck, recreational vehicle (RV), boat, plane, or other mobile machine for transporting people or goods. In many cases, the vehicle 102a may be powered by an internal combustion engine. As another possibility, the vehicle 102a may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, vehicle features control, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102a. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102a. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The computing platform 104 may be further configured to communicate with various components of the vehicle 102a via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various electronic control units (ECUs) 168 of the vehicle 102a configured to perform various options. For instance, the computing platform may be configured to communicate with a telematics control unit (TCU) 170 configured to control telecommunication between vehicle 102a and a cloud 172 through a wireless connection 174 using a modem 176. The wireless connection 174 may be in the form of various communication network e.g. a cellular network. The term cloud is used as a general term in the present disclosure and may include any computing network involving computers, servers, controllers or the like configured to store data and perform data processing functions and facilitate communication between various entities.

The ECUs 168 may further include an autonomous driving controller (ADC) 178 configured to monitor and control the autonomous driving features of the vehicle 102a. The ECUs 168 may further include a dedicated short-range communication (DSRC) controller 180 configured to communicate with one or more digital entities such as a fleet vehicle 102b via a DSRC link 182. Alternatively, the vehicle 102a may be configured to communicate with the fleet vehicle 102b via wireless connections enabled by the wireless transceiver 132 using other types of connections such as Wi-Fi or the like. It is noted that the ECUs 168 illustrated in FIG. 1 are merely a few examples and more ECUs 168 may be provided to the vehicle 102a to perform various operations. As a few non-limiting examples, the ECUs 168 may further include a powertrain control module (PCM) configured to control powertrain operations, a body control module (BCM) configured to control body operations, a usage-based insurance (UBI) device configured to record vehicle operations and report to an insurance provider, or the like. All ECUs 168 may be operated via software/applications stored locally within the ECUs 168 or in the storage 110 of the computing platform 104. The software may be updated through the cloud 172 via the TCU 170. Additionally or alternatively, the update data may be downloaded through different entities such as the mobile device 128 and the fleet vehicle 102b, and shared with the vehicle 102a.

Figure 2:
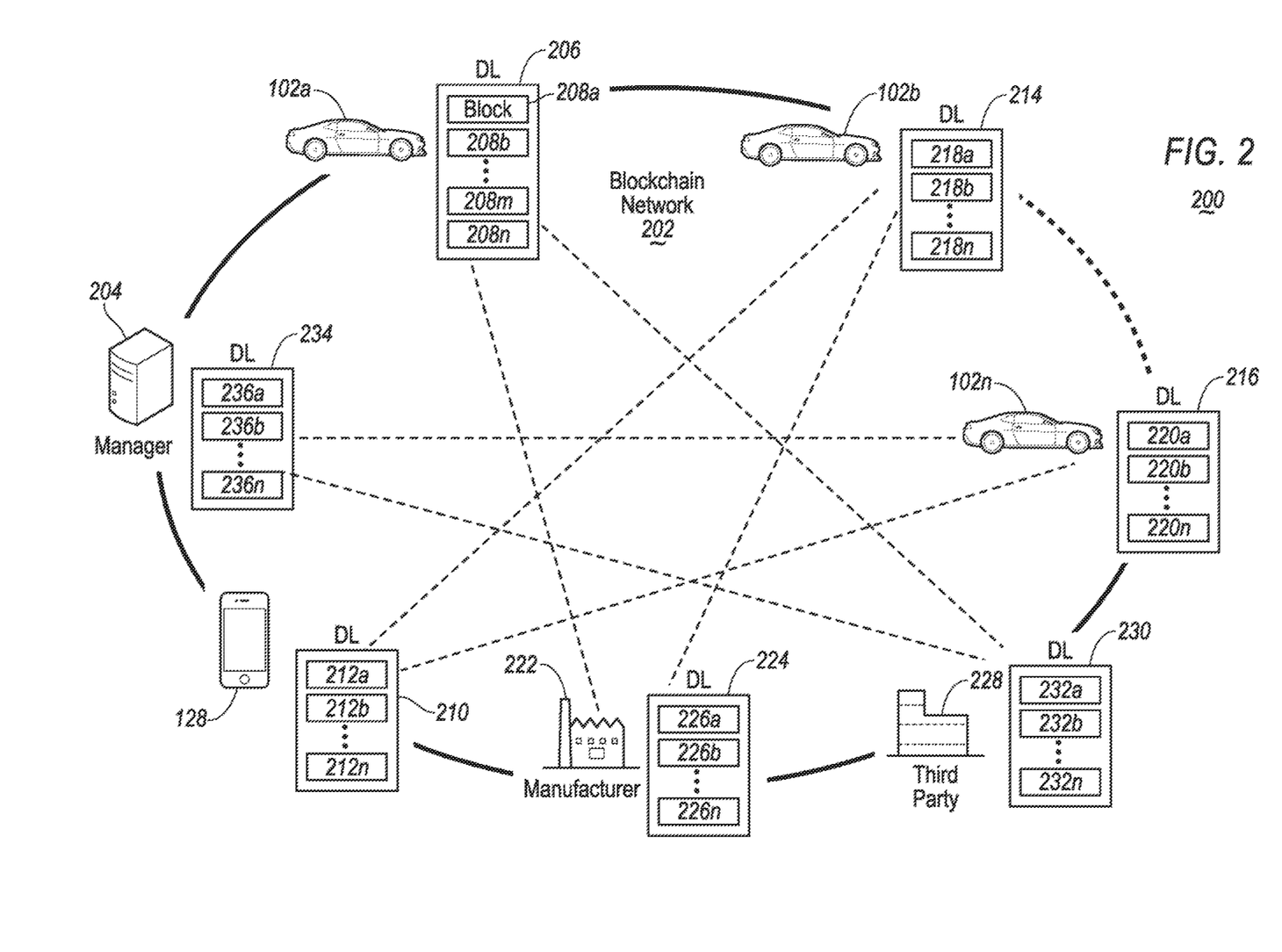
FIG. 2 illustrates an example topology diagram of a vehicle software update network of one embodiment of the present disclosure.

Referring to FIG. 2, an example topology diagram 200 of a vehicle software update network 202 (a.k.a. vehicle network, blockchain network, or update network) of one embodiment of the present disclosure is illustrated. In the present example, the vehicle software update network 202 may be a blockchain network, although other types of network configurations may be used. The vehicle software update network 202, as a blockchain network, may be a peer-to-peer (P2P) network having multiple nodes connected with each other. The vehicle 102a may be connected to the blockchain network 202 as a nod via various wireless connections as discussed with reference to FIG. 1 through the cloud 172. Additionally, multiple fleet vehicles 102b..., 102n may be connected to the blockchain network 202 via corresponding applications. Taking the vehicle 102a for instance, the computing platform 104 may be configured to connect to the blockchain network via a blockchain network application stored in the storage 110, e.g. as one of the vehicle applications 108. The blockchain network application 108 may contain communication rules, terms and conditions, or the like specified by a fleet manager 204 to control vehicle updates.

The fleet manager 204 may serve as a node of the blockchain network 202 configured to coordinate and manage software update for vehicles 102. Each node of the blockchain network 202 may be configured to maintain a distributed ledger individually within its own storage device. For instance, the vehicle 102a may be configured to maintain the distributed ledger 206 stored in the storage 106. Each distributed ledger maintained by each node of the blockchain network 202 may include multiple blocks for data logging purposes. Taking the distributed ledger 206 of the vehicle 102a for instance, the data chain included in the distributed ledger 206 may grow at a block-by-block basis. A successor block 208b may contain a cryptographic hash of a previous block 208a, a timestamp indicative of a time of creation of the successor block 208b, and transaction data stored to the successor block 208b. The same configuration may be implemented at other nodes of the blockchain network 202.

The blockchain network 202 may include multiple nodes involving various parties/entities. For instance, the mobile device 128 may be connected to the blockchain network 202 as a node having a distributed ledge 210 with multiple blocks 212. Additionally, multiple fleet vehicles 102b . . . 102n may also connected to the blockchain network as nodes configured to maintain their own distributed ledgers 214, 216 and blocks 218, 220. The blockchain network 202 may further include a vehicle manufacturer 222 maintaining a distributed ledger 224 having blocks 226, and third-party provider 228 maintaining a distributed ledger 230 having blocks 232. The third-party provider 228 may include any business entity associated any part of the vehicles 102, such as an original equipment manufacturer (OEM). The operation of the blockchain network 202 may be managed by the manager 204 also server as a node maintaining a distributed ledger 234 having blocks 236. It is noted that the blockchain network 202 illustrated with reference to FIG. 2 is merely an example and the blockchain network 202 may include more, fewer, or different nodes involving various parties illustrated or not illustrated in FIG. 2.

The manager 204 may be configured to perform various operations to manage and coordinate the operation of the blockchain network 202. For instance, the manager 204 may be configured to operate as a miner (a.k.a. validator) configured to validate transactions between nodes. Additionally, the manager 204 may be configured to coordinate the vehicle software update process using P2P data sharing technology. Depending on the specific update, some updates may require a large amount of data transmission between the cloud 172 and the vehicles 102, which may be impractical due to restraints such as network subscription access. The manager 204 may be configured to address such issue by dividing the update files into partitions and facilitate the fleet vehicles as well as other entities (e.g. the mobile device 128) to work collaboratively to perform update file transactions. For instance, the manager 204 may divide a large update file from the vehicle manufacturer 222 into multiple smaller partitions and transfer the smaller partitions to the mobile device 128 associated with the vehicle 102a via Wi-Fi overnight. Along with the partitions, instructions and identifier may also be transferred to allow the mobile device 128 to send the partitions to the target vehicle 102 once connected e.g. via the wireless connection 130. Additionally, multiple fleet vehicles 102 may be configured to each download different partitions for the same update file, and share the partitions once connected to each other, e.g. via the DSRC link 182. The manager 204 may be configured to collect necessary information from various nodes of the blockchain network 202 for planning/coordination related to the vehicles 102 update. As a few non-limiting examples, the information collected by the manager 204 may include vehicle pick-up/drop-off time and locations, destinations, points-of-interest (POIs), user calendar, pre-determined routes, favorite places, trips, most frequently visited places, events, bookings or the like. With such information from multiple users and vehicles 102, the manager may plan and coordinate the update procedure for multiple vehicles 102.

Figure 3:
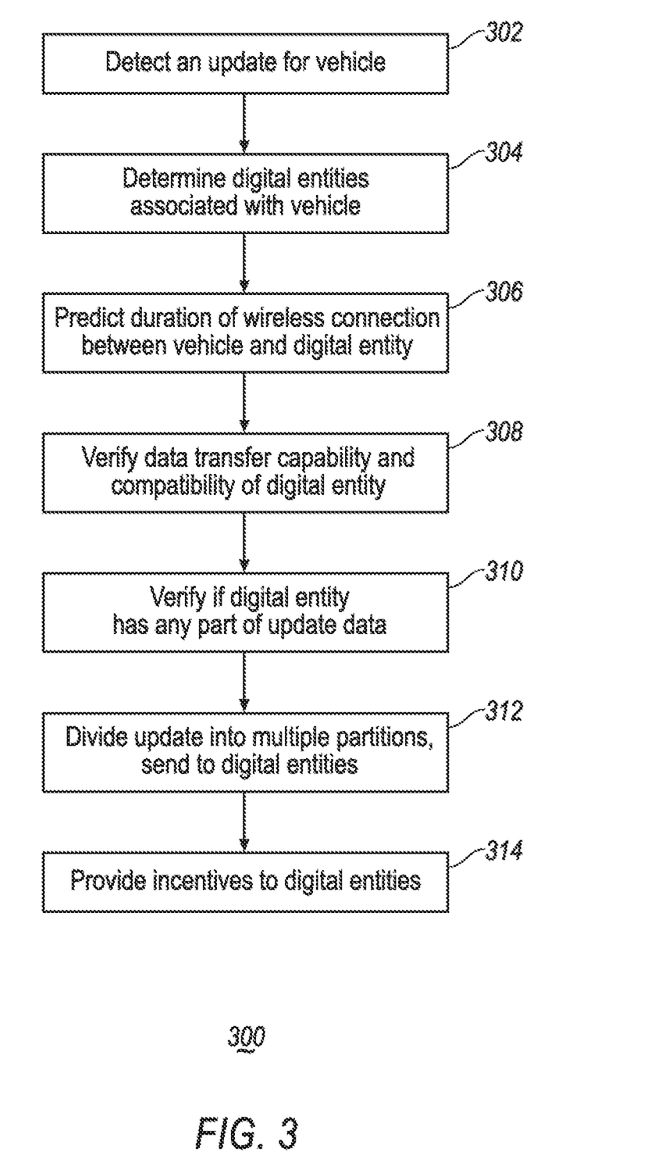
FIG. 3 illustrates an example flow diagram of a process for update planning of one embodiment of the present disclosure.

Referring to FIG. 3, an example flow diagram of a process 300 for planning/coordinating vehicle updates of one embodiment of the present disclosure is illustrated. At operation 302, the manager 204 detects a software update is available for the vehicle 102a. The software update may be from the vehicle manufacturer 222 or the third-party provider 228 configured to update software for the ECUs 168 and/or the vehicle applications 108. For instance, the vehicle manufacturer 222 may publish a newer version software for the ADC 178 providing new features for the vehicle 102a as well as for other fleet vehicles 102. The new software update may be first made available to the manager 204 instead of being transmitted to each vehicle individually. At operation 304, the manager 204 determines how many digital entities are associated with the vehicle 102a and identifies each of those digital entities. The digital entities may include the mobile device 128 of a user or a fleet vehicle 102 associated with the vehicle 102a. For instance, the mobile device 128 may be previously paired with the vehicle 102a. A fleet vehicle 102 may be a vehicle previously parked at the same parking lot as the vehicle 102a within a wireless transmission range of each other determined by prior location data. Responsive to determining the digital entities associated with the vehicle 102a, at operation 306, the manager 204 predicts a duration of connection time between the digital entity and the vehicle 102a for data transmission. This operation may be performed in various ways. As discussed above, the manager 204 may use a calendar of a user to predict a travel schedule of the user and therefore the time of connection. The user does not have to be the owner of the vehicle 102a, but any user associated with the vehicle 102a (e.g. a passenger). Alternatively, manager 204 may use the user schedule and/or navigation data received from the vehicle 102a and a fleet vehicle 102b to predict these two vehicles may travel and/or park together for a certain period of time, providing an opportunity for data sharing through a wireless connection (e.g. the DSRC link 182). Responsive to identifying and determining one or more digital entities may be connected to the vehicle 102a, at operation 308, the manager 204 verifies data transfer capability and connection compatibility of the digital entities. Taking the mobile device 128 for instance, the wireless transceiver 142 may support various types of wireless technologies depending on the specific hardware and software configuration of the mobile device 128. Therefore, wireless data transfer speed may be calculated by the manager 204. Similarly, data sharing speed and compatibility between fleet vehicles 102 may be calculated and determined by the manager 204.

At operation 310, the manager 204 checks and verifies if the digital entity has already had any part of the update data. Due to the data sharing nature of the blockchain network 202, one partition of update data may be shared across the whole network 202 between multiple vehicles 102 and nodes. In some situations, the digital entity identified by the manager 204 may already had the full or a part of the update data. In this case, it may be unnecessary for the digital entity to re-download the data. At operation 312, the manager 204 divide the update data into multiple partitions and sends the partitions to the digital entities based on the previous analysis result. Additionally, the manager 204 may send instructions to the digital entity and/or the vehicle 102a to facilitate identification and data sharing therebetween. To encourage data sharing between vehicles and entities, the manager 204 may be further configured to provide incentives to those digital entities that performs the data sharing. The incentives may be provided to the digital entities after the data sharing is complete. The incentives may include various monetary or non-monetary rewards, such as service coupons, digital currency, or the like as a few non-limiting examples.

Figure 4:
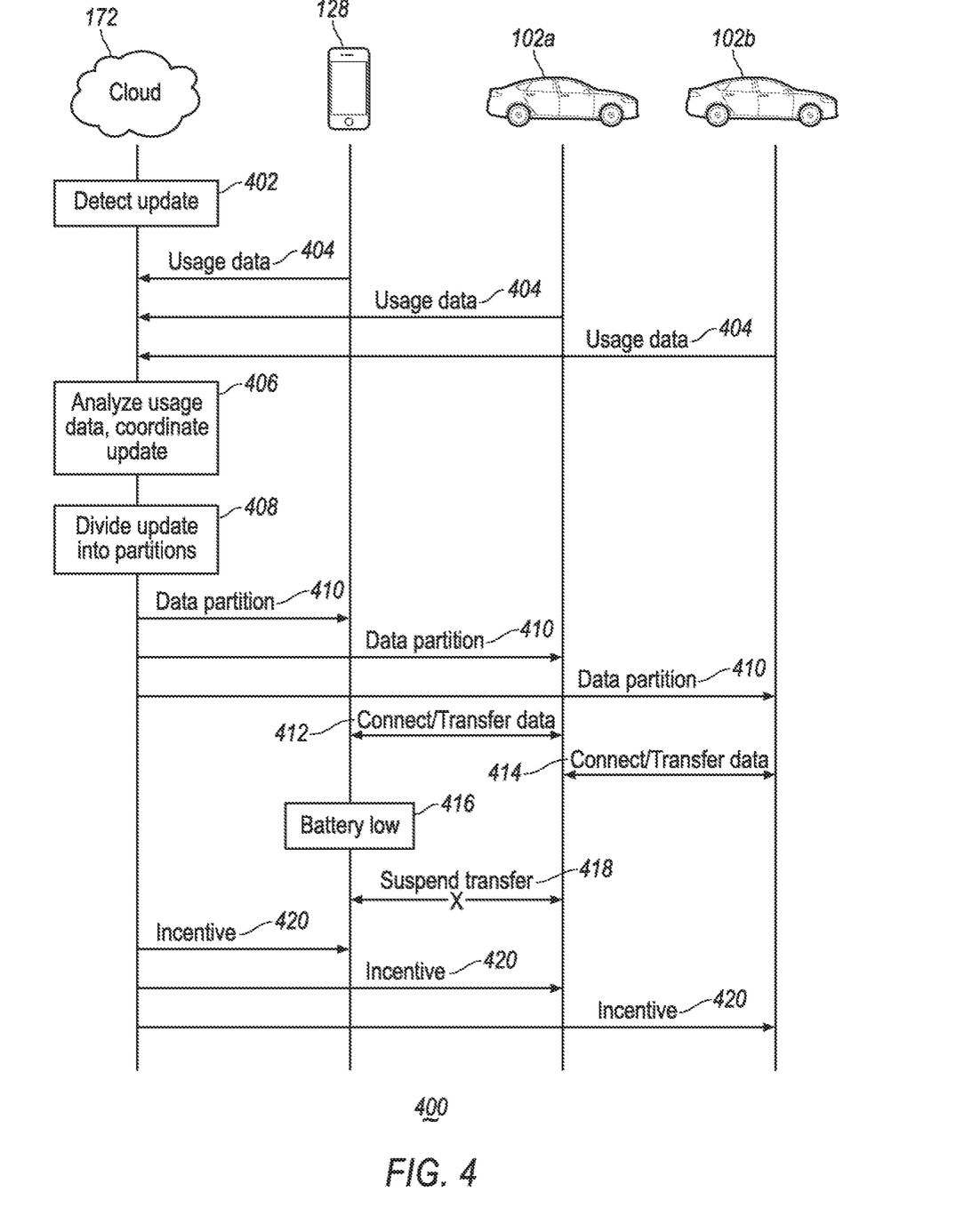
FIG. 4 illustrates an example data flow diagram of a process for software updating of one embodiment of the present disclosure.

Referring to FIG. 4, an example data flow diagram of a vehicle software update process 400 of one embodiment of the present disclosure. With continuing reference to FIGS. 1-3, at operation 402, the cloud 172, which includes the manager 204, detects a vehicle software update for multiple fleet vehicles 102. The software update may be applicable for both vehicle 102a and vehicle 102b. At operation 404, the cloud 172 collects usage data from various entities of the vehicle network 202 to analyze associations therebetween. The usage data may include any past or current data/log from the entity indicative of a usage pattern and/or connection associations with other entities. As a few non-limiting examples, the usage data may include past/current vehicle pick-up/drop-off time and locations, location history of mobile device 128, destinations, POIs, user calendar, predetermined routes, favorite places, trips, most frequently visited places, events, bookings, prior connection history/log or the like. As illustrated in FIG. 4, the cloud 172 collects the usage data from the mobile device 128, vehicle 102a and vehicle 102b in the present example, although usage data from other nodes of the vehicle network 202 may be also collected. With the usage data collected, at operation 406, the cloud 172 analyzes the usage data to find associations between the entities. In the present example, the cloud 172, determines an association between the mobile device 128 and the vehicle 102a as the mobile device 128 has been previously connected with the vehicle 102a. Additionally, the cloud 172 further determines an association between the fleet vehicles 102a and 102b as past location history of both vehicles suggests they share a common location (e.g. a work parking lot). With the associations between the entities identified, the cloud 172 further analyze the data sharing capability and compatibility of those identified entities for data transfer purposes. Some entities may have greater data transfer and storage capabilities than others. For instance, the vehicle may have a greater data storage and transfer capability compared to the mobile device because of larger storage and vehicle battery capacities. As for system compatibility, some operating systems may have restrictions for certain types of data sharing. The cloud 172 may need to verify the entities are compatible for data sharing.

Responsive to determine the associations and verifying capability, at operation 408, the cloud 172 next plans and coordinates the software update process by dividing the update data into multiple partitions based on the determination results. At operation 410, the cloud sends the data partitions to each of the identified entities. The cloud 172 may be configured to only send the partitions when certain predefined conditions are met. For instance, the predefined condition may include a battery level of the entity and only transmit the data partition when the battery level is above a threshold to prevent drainage of the battery. Additionally, the condition may include certain predefined network connections and only send the data when the entities are connected to the cloud via a free-of-charge network (e.g. a Wi-Fi network). Responsive to receiving the data partitions, the entities store the data in the storage (e.g. the storage 110, and/or the storage 158) and wait until later connected to the corresponding entities to start sharing. For instance, at operation 412, the mobile device 128 connects to the vehicle 102a and starts to transfer the data partition to the vehicle 102a. At operation 414, the fleet vehicles 102a and 102b connects to each other and starts to transfer data. The data transfer between the fleet vehicles 102a and 102b may be duplex. The vehicle 102a may receive data partitions from the vehicle 102b while transmitting data partitions to the vehicle 102b so the update data may be shared between the fleet vehicles 102. The entities may be configured to only share the data under certain predefined conditions. For instance, at operation 416, responsive to detecting the battery level is lower than a predefined threshold, the mobile device 128 suspends the data transfer to the vehicle 102a at operation 418. Additionally, a message may be output via the mobile device 128 and/or the vehicle 102a informing the user about the suspension and encourage to recharge the mobile device 128. Additionally, the predefined condition may further include a geofence and the mobile device 128 (as well as other entities) may only transfer the data within or outside such geofence. Similarly, the vehicle 102a may be configured to suspend data transfer with other entities responsive to detecting a predefined condition such as low battery. This may be important of an electric vehicle powered by battery, because it may be undesirable to drain the vehicle battery and reduce the range of the vehicle. At operation 420, the cloud 172 provides incentives to the entities participated the data sharing. The incentives may be issued after confirming a successful data transfer from the entities to prevent abuse and misuse.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A remote server, comprising:
   a memory configured to store a software update for a vehicle; and
   a processor configured to
   responsive to receiving first usage data from the vehicle indicative of a usage pattern of the vehicle, analyze the first usage data to identify a mobile device associated with the vehicle;
   receive second usage data from the mobile device indicative of a usage pattern of the mobile device, the second usage data including a prior connection history between the mobile device and the vehicle;
   predict the mobile device and the vehicle to be within a predefined distance for establishing a wireless connection for a period of time calculated using the usage pattern of vehicle and the usage pattern of the mobile device;
   responsive to verifying a capability of the mobile device, divide the software update into multiple partitions, the capability of the mobile device including speed of the wireless connection, the period of time, storage capacity and battery status; and
   transmit one or more partitions to the mobile device for sharing with the vehicle over the wireless connection.

2. The server of claim 1, further comprising:
   a network interface, configured to receive the software update from a software provider.

3. The server of claim 1, wherein the processor is further configured to send a sharing instruction to the mobile device to identify the vehicle to share the one or more partitions.

4. The server of claim 3, wherein the sharing instruction includes a sharing condition for the mobile device to share the one or more partitions with the vehicle.

5. The server of claim 4, wherein the sharing condition includes: a battery threshold for the mobile device above which the sharing may be performed.

6. The server of claim 1, wherein the first usage data identifies at least one of: vehicle pick-up time, vehicle pick-up location, vehicle drop-off time, vehicle drop-off location, vehicle location history, previous destinations of the vehicle, points-of-interest of the vehicle, favorite places of the vehicle, or prior connection history of the vehicle.

7. The server of claim 1, wherein the second usage data is indicative of at least one of: appointments of user calendar, events, or bookings.

8. A digital entity, comprising:
   a memory; and
   a processor, configured to
   send digital entity usage data indicative of a usage pattern of the digital entity to a server;
   verify that the digital entity has already obtained a portion of a software update;
   responsive to receiving a first partition from the server, store the first partition in the memory;
   receive a sharing instruction indicative of a prediction to establish a wireless connection for a period of time with a vehicle to which the first partition is designated, wherein the period of time is calculated using a usage pattern of vehicle and the usage pattern of the digital entity;
   responsive to establishing a wireless connection with the vehicle, transmit the first partition to the vehicle; and
   responsive to detecting a battery level of the digital entity is below a predefined threshold, suspend data transmission to the vehicle.

9. The digital entity of claim 8, further comprising a wireless transceiver, configured to connect to the vehicle through one of the following technologies: Wi-Fi, near-field communication, radio-frequency identification, Bluetooth, or dedicated short-range communication.

10. The digital entity of claim 8, wherein the sharing instruction includes a sharing condition, and the processor is further programmed to
    transmit the first partition to the vehicle responsive to verifying the sharing condition is met.

11. The digital entity of claim 10, wherein the sharing condition includes a geofence, and verifying the sharing condition includes verifying the digital entity.

12. The digital entity of claim 10, wherein the sharing condition includes a battery threshold, the processor is further programmed to, responsive to detecting a battery level of the digital entity is below the battery threshold, suspend transmission of the first partition and output a message asking to recharge the battery.

13. The digital entity of claim 8, wherein the digital entity is a fleet vehicle, the processor is further configured to receive a second partition from the vehicle through the wireless connection.

14. A method for a server, comprising:
    detecting a software update is ready for multiple fleet vehicles;
    receiving usage data from the multiple fleet vehicles, the usage data including a location history of the fleet vehicles;
    analyzing the usage data to identify associations between the multiple fleet vehicles and responsive to identifying the fleet vehicles have parked close to each other within a wireless transmission range based on the location history, predict a future connection having a predicted duration of connection based on the usage data received from the multiple fleet vehicles and verify a data sharing speed between the fleet vehicles via the future connection;
    dividing the software update into multiple partitions based on the future connection;
    transmitting at least one partition to one of the multiple fleet vehicles involved in the future connection for data sharing; and
    responsive to receiving a message from one of the multiple fleet vehicles indicative of a successful data sharing, provide an incentive to at least one of the fleet vehicles involved in the data sharing.

15. The method of claim 14, further comprising:
    sending a sharing instruction to the at least one of the multiple fleet vehicles to identify a target vehicle to share the at least one partition.

16. The method of claim 15, wherein the sharing instruction includes a sharing condition for the at least one of the multiple fleet vehicles to share the partition.

17. The method of claim 16, wherein the sharing condition includes at least one of: a geofence, or a battery threshold.

18. The server of claim 1, wherein the processor is further configured to:
   analyze if the mobile device has already obtained at least a part of the software update;
   send a part of the software data to the mobile device to avoid the mobile device re-downloading data already obtained by the mobile device.

\* \* \* \* \*